United States Patent [19]

Osborne

[11] Patent Number: 4,537,293
[45] Date of Patent: Aug. 27, 1985

[54] HYDRAULIC CYLINDER ASSEMBLIES

[75] Inventor: Duncan W. Osborne, Leamington Spa, England

[73] Assignee: Automotive Products plc, Leamington Spa, England

[21] Appl. No.: 594,431

[22] Filed: Mar. 29, 1984

Related U.S. Application Data

[63] Continuation of Ser. No. 326,040, Nov. 30, 1981, abandoned.

[30] Foreign Application Priority Data

Dec. 9, 1980 [GB] United Kingdom ............ 8039439

[51] Int. Cl.³ ................................ F16D 65/56
[52] U.S. Cl. ........................ 188/196 BA; 92/13.8; 92/62; 92/75; 92/131; 188/79.5 GE; 188/326; 188/364; 192/85 AT; 192/111 A
[58] Field of Search ............... 188/79.5 GE, 725 P, 188/196 BA, 196 D, 331, 333, 326, 364; 192/75, 111 A, 85 AT; 92/62, 75, 13.3, 13.8, 131

[56] References Cited

U.S. PATENT DOCUMENTS

| | | | |
|---|---|---|---|
| 2,130,875 | 9/1938 | Colman | 188/364 X |
| 2,190,228 | 2/1940 | Bowen | 92/131 X |
| 2,275,722 | 3/1942 | Bowen | 92/62 |
| 2,424,233 | 7/1947 | Greenough | 92/131 X |
| 3,360,085 | 12/1967 | Belart | 188/196 BA X |
| 3,532,193 | 10/1970 | Kaiser | 188/196 BA X |
| 3,610,374 | 10/1971 | Troyes | 188/196 BA X |
| 3,811,538 | 5/1974 | Farr | 188/196 D X |
| 3,822,003 | 7/1974 | Prange et al. | 188/196 BA X |
| 3,838,757 | 10/1974 | Farr | 188/79.5 P |
| 4,301,897 | 11/1981 | Cox, Jr. | 188/196 BA |
| 4,369,863 | 1/1983 | Farr et al. | 188/326 X |

FOREIGN PATENT DOCUMENTS

| | | |
|---|---|---|
| 1927808 | 12/1970 | Fed. Rep. of Germany . |
| 1655384 | 5/1971 | Fed. Rep. of Germany . |
| 1655338 | 11/1971 | Fed. Rep. of Germany . |
| 742876 | 1/1956 | United Kingdom ............ 188/364 |
| 1418681 | 12/1975 | United Kingdom . |
| 1513740 | 6/1978 | United Kingdom . |
| 2023245 | 12/1979 | United Kingdom . |

Primary Examiner—George E. A. Halvosa
Attorney, Agent, or Firm—Kemon & Estabrook

[57] ABSTRACT

A drum brake hydraulic wheel cylinder assembly comprises a pair of piston assemblies and an abutment member. The piston assemblies are of the kind comprising an adjustable variable length tappet assembly having interengaged screw-threaded components. To enable thrust to be transmitted from one adjacent brake shoe to the other, i.e. for parking purposes, the abutment member is slidable in the cylinder bore against a spring centering device.

7 Claims, 7 Drawing Figures

HYDRAULIC CYLINDER ASSEMBLIES

This application is a continuation of application Ser. No. 326,040, filed Nov. 30, 1981, now abandoned.

The invention relates to hydraulic wheel cylinder assemblies for internal shoe drum brakes and in particular to brakes of the kind in which the wheel cylinder assembly is interposed between one pair of adjacent ends of a pair of brake shoes and acts as a spacing strut for said ends and a mechanical expander and fixed abutment means are interposed between the other pair of adjacent ends of the shoes.

A drum brake of the kind referred to is described in British Patent Specification No. 1,513,740. It has leading-and-trailing shoe performance in the hydraulic actuating mode, giving stable and consistent performance in both directions of drum rotation, with duo-servo shoe performance in the mechanical mode, giving a high torque restraint in both directions of parking purposes. However, whilst the wheel cylinder assembly shown in this patent specification performs satisfactorily it has a disadvantage concerning the installation of the brake on a motor vehicle. Space and other restraints sometimes require the brake to be mounted with the shoes disposed either side of the horizontal centreline. In this arrangement the weight of the shoes tends to cause the wheel cylinder pistons and the shoes to fall under the combined effects of vibration and gravity, despite the presence of friction created by the shoe hold-down springs, and so cause brake drag.

According to the invention there is provided a hydraulic wheel cylinder assembly for an internal shoe drum brake and comprising a cylinder body having a through bore therein, a pair of piston assemblies slidable in said bore, an abutment member interposed between the piston assemblies and an inlet port in the body opening into the bore for supplying hydraulic pressure to urge the piston assemblies away from each other, each piston assembly having an adjustable variable length tappet assembly for transmitting a thrust to an adjacent brake shoe and comprising a rotatable screw-threaded component interengaged with a non-rotatable screw-threaded component, the abutment member being axially slidable in said bore in either direction against a spring centering device.

Preferably each piston assembly comprises a one-way drive mechanism arranged to effect rotation of the rotatable screw-threaded component in the direction to increase the length of the tappet assembly in response to excessive linear movement of the respective piston assembly relative to the abutment, each one-way driving mechanism including respective driven means which is rotationally fast with the respective rotatable screw-threaded component and respective driving means which is carried by the abutment member.

Some embodiments of the invention will now be described by way of example and with reference to the accompanying drawings, of which:

Figure 1:
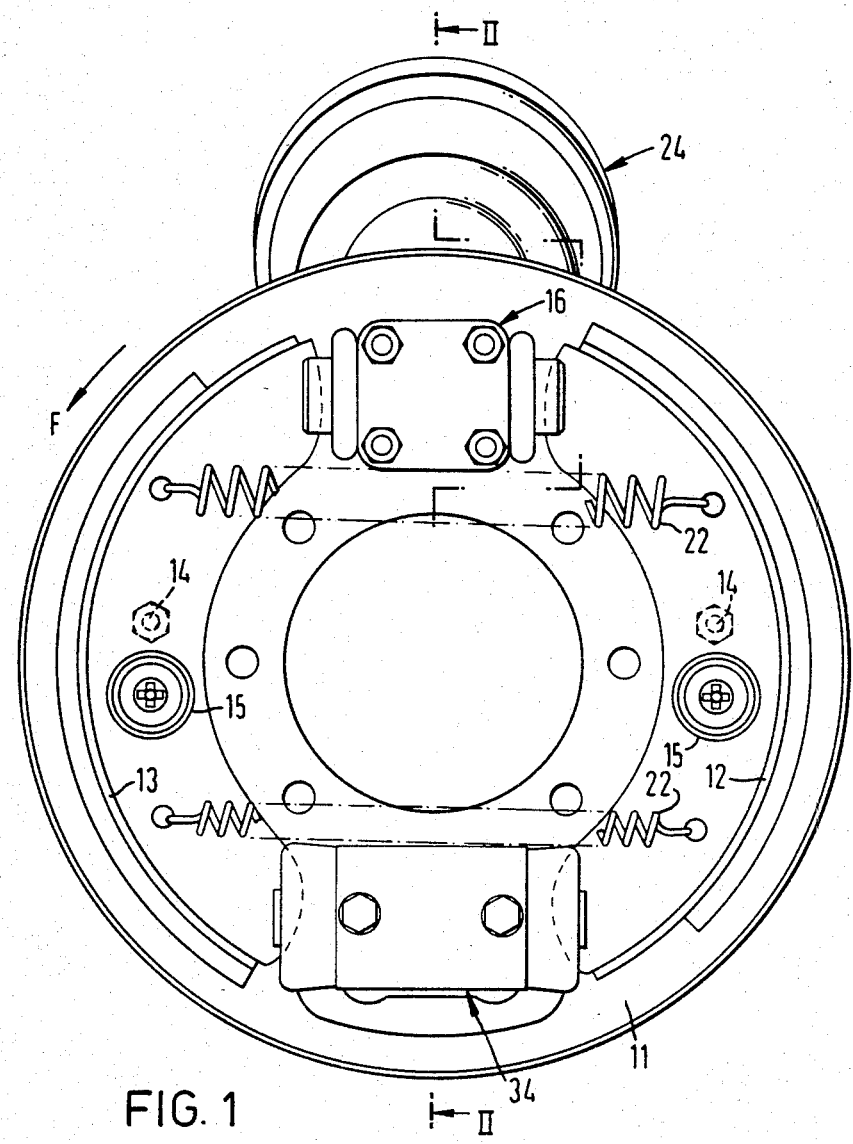
FIG. 1 is an elevation of an internal shoe drum brake assembly incorporating one embodiment of a hydraulic wheel cylinder assembly according to the invention.
Figure 2:
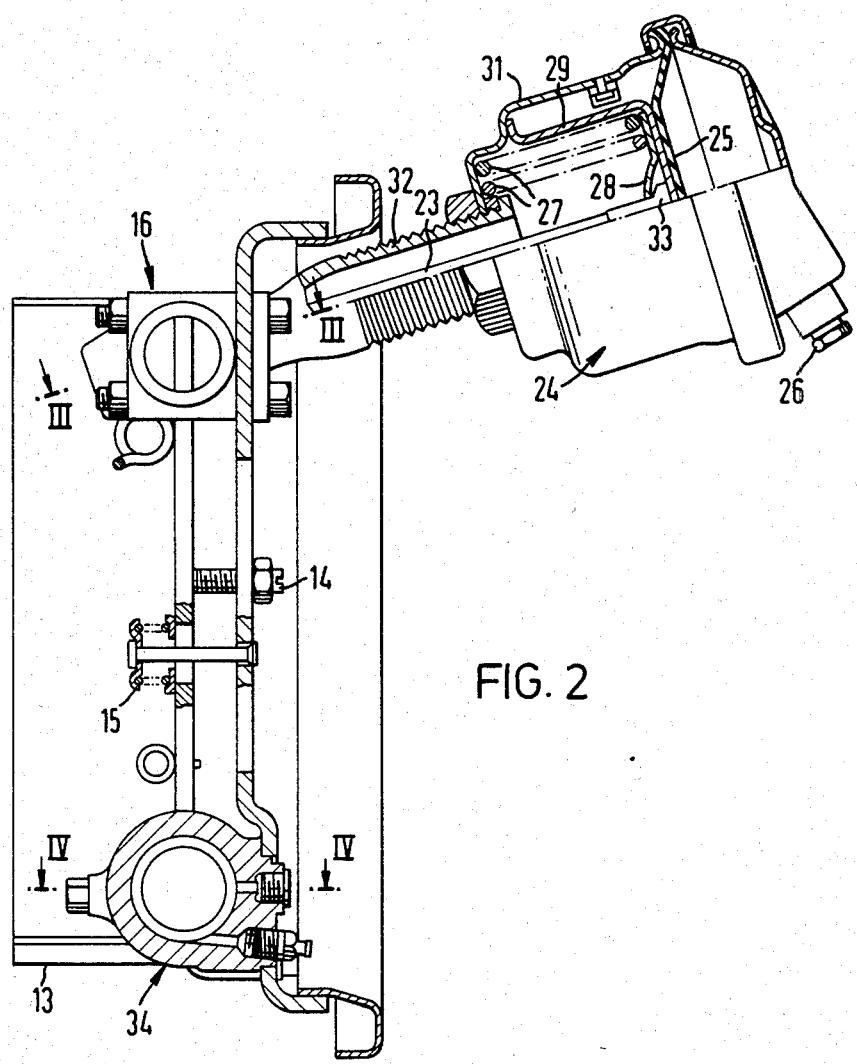
FIG. 2 is a cross-sectional elevation on the line II—II in FIG. 1.
Figure 3:
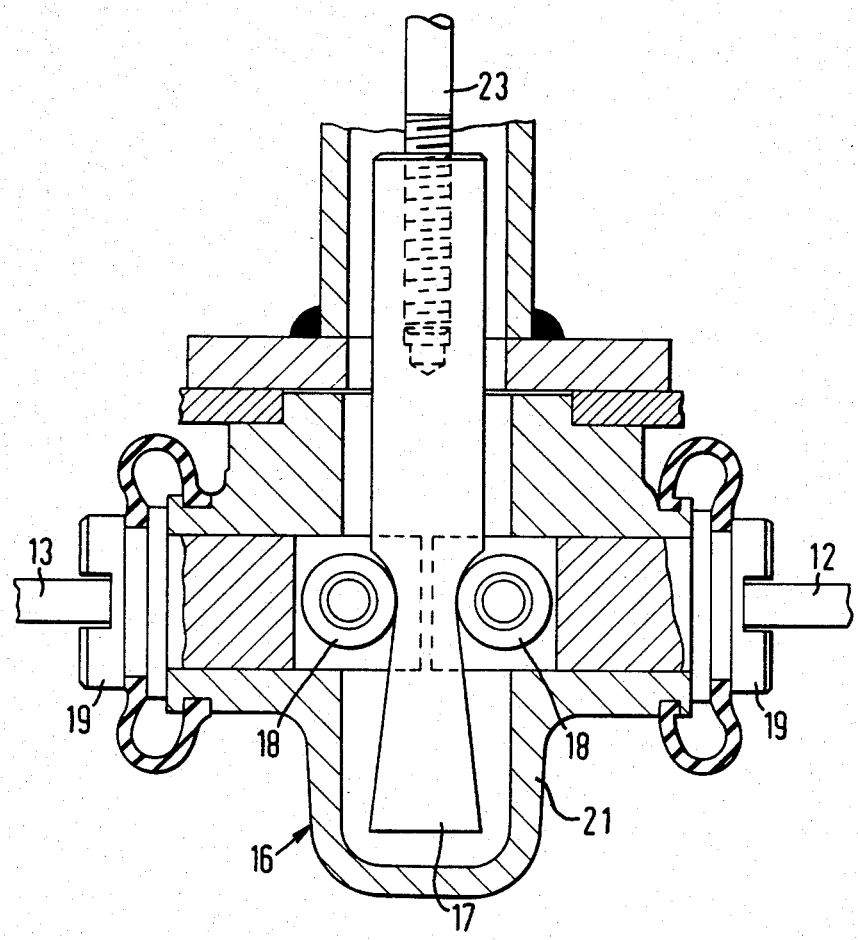
FIG. 3 is a cross-section on the line III—III in FIG. 2 drawn to a larger scale.

The drum brake shown in FIGS. 1 to 4, includes a backplate 11 and a pair of brake shoes 12 and 13 spaced slightly from the backplate by adjustable steady pins 14. The usual hold down spring assemblies 15 are provided.

Between one pair of adjacent ends of the brake shoes 12 and 13 there is a mechanical expander 16 (FIG. 3) which comprises a wedge 17 operating between rollers 18 carried by tappets 18. The tappets are a sliding fit in the expander body 21 and each has a head which provides an abutting shoulder with the body 21 to react the load of the usual pull-off springs 22 and also brake drag loads as will be described later.

The wedge 17 is connected to a pull-rod 23 of a spring actuator assembly 24. A diaphragm 25 subject to air pressure at port 26 normally keeps the expander 16 in the inoperative state shown in FIG. 3 against the load of coil springs 27 which act through a dished plate 28 against a cup-shaped plate 29. The springs 27 react against a housing 31 which is retained on a support tube 32. When the air pressure at port 26 is released the springs 27 act through plate 28 onto a head 33 on the pull-rod 23, pulling the wedge 17 to urge the tappets 19 apart.

Figure 4:
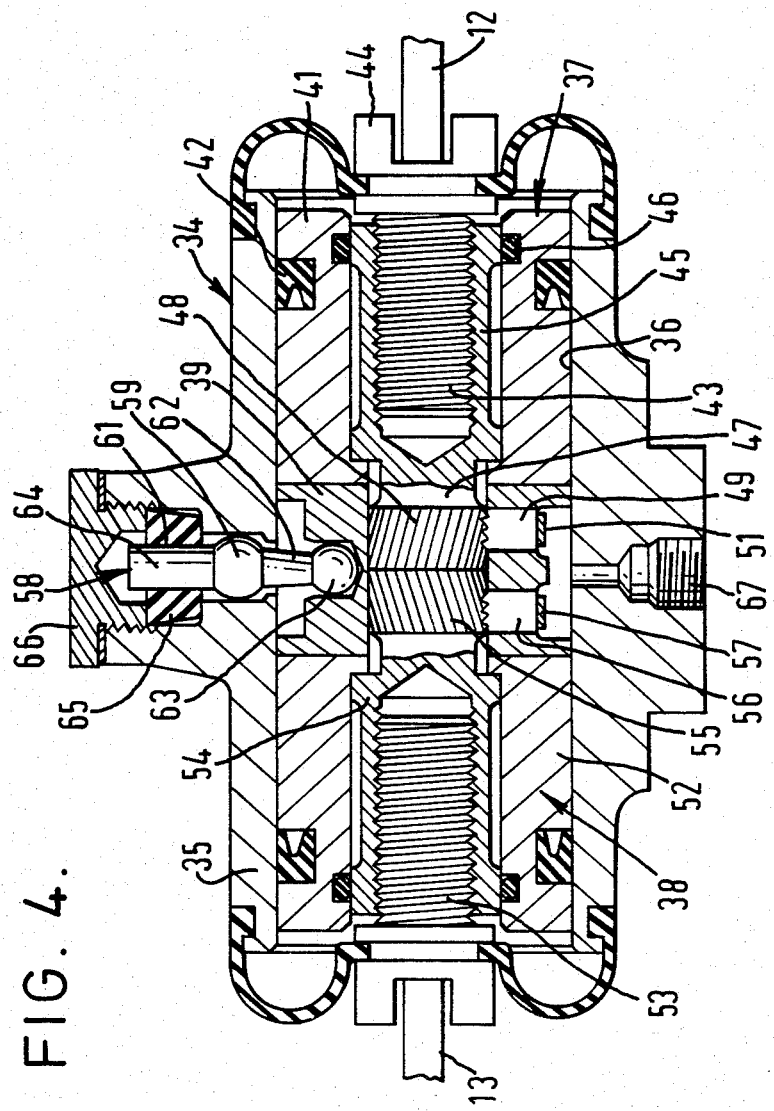
FIG. 4 is a cross-section on the line IV—IV in FIG. 2 drawn to the same scale as FIG. 3.

A hydraulic wheel cylinder assembly 34 according to the invention is between the other pair of adjacent ends of the brake shoes 12 and 13, being shown in more detail in FIG. 4. It comprises a cylinder body 35 having a through bore 36 in which are slidable a pair of piston assemblies 37 and 38.

An abutment member 39 is interposed between the piston assemblies 37 and 38.

Piston assembly 37 includes a piston body 41 having a groove for a rubber seal 42 and an axial stepped bore into which is received a tappet assembly comprising a fixed screw-threaded component in the form of a screw 43 having a slotted head 44 for engaging the adjacent tip of brake shoe 12 and a rotatable screw-threaded component in the form of a sleeve nut 45. The sleeve nut 45 is a sliding fit in the bore of the piston body 41, being sealed by a rubber seal 46, and has an axial extension 47 which extends into an axial bore in the abutment member 39.

The axial extension 47 carries helical ratchet teeth 48 which co-operate with corresponding ratchet teeth on a pawl peg 49 which is carried in a radial bore in the abutment member 39. A spring clip 51 formed from spring steel strip into a C shaped provides a spring bias for the pawl peg 49.

Piston assembly 38 is generally similar to piston assembly 37. However, whilst piston body 52 can be identical to piston body 41, the screw 53 and sleeve nut 54, corresponding to screw 43 and sleeve nut 45 respectively, have threads of the opposite hand to these corresponding components. Similarly the helical ratchet teeth 55 are formed with the opposite hand spiral to ratchet teeth 48. Another pawl peg 56, similar to pawl peg 49, is carried in another radial bore in the abutment member 39 and is biassed by a spring 57 of similar shape to spring 51.

The abutment member 39 is slidable in the bore 36 in either direction away from a centered position as shown against the resilient load of a spring centering device which comprises a lever 58 having a part-spherical portion 59 by which it is pivotable in a bore 61 in the cylinder body 35. One arm 62 of the lever terminates in another part-spherical portion 63 which is engaged in a radial recess in the abutment member 39 and the other arm 64 extends through a rubber bush 65 which is retained by a screw cap 66.

As shown in FIG. 4 the piston assemblies 37 and 38 are in abutment with the abutment member 39, being biassed by the pull-off springs 22. An inlet port 67 is provided for supplying hydraulic pressure under the control of the driver of a vehicle to which the brake is to be fitted.

When installed on a vehicle the brake is normally fitted with the axis of the wheel cylinder 34 vertical, so that the brake shoes 12 and 13 are in fact disposed either side of the horizontal centre line of FIG. 1 if the drawing is rotated through 90°. For service braking hydraulic pressure is supplied to inlet port 67 of the wheel cylinder 34 to move the piston assemblies 37 and 38 away from each other and the abutment member 39 to apply brake shoes 12 and 13 to an associated brake drum (not shown). The expander body 16 reacts to the shoe tip loads on the heads of tappets 19 as previously described so that the brake functions as a leading-and-trailing shoe brake for both directions of drum rotation.

For parking, or in emergencies, air is released from port 26 in the spring actuator 24 to allow springs 27 to act on the wedge 17. For forwards drum rotation, as indicated by arrow F (FIG. 1), only the tappet 19 acting on shoe 13 moves under the wedging action, the other tappet 19 acting on shoe 12 having to react a greater load than is applied by the wedge 17. This is because piston assembly 38 transmits the drag load from the trailing end of the shoe 13 through the abutment member 39 to piston assembly 37 which applies the load to the leading end of shoe 12 in the manner of a duo-servo brake. For reverse brake drum rotation the tappet 19 acting on shoe 12 moves and the tappet acting on shoe 13 provides the reaction. The abutment member 39 slides in the bore against the spring centering effect created by lever 58 which pivots about part-spherical portion 59 to deform the rubber bush 65.

The spring centering device which includes the lever 58 serves two purposes. When the brake is installed as described above and, for example, brake shoe 12 is uppermost, then bush 65 acts through the lever 58, the piston assembly 37 to help support the weight of shoe 12 and, by virtue of the tension of the pull-off springs 22, that of shoe 13 also. The shoes 12 and 13 are also supported in the usual manner by the friction created by the hold-down spring assemblies 15.

The other purpose of spring centering device is in connection with the automatic adjustment of the variable length tappet assembly which comprises the screw 43 and sleeve nut 45 and a one-way drive mechanism which includes the helical teeth 48 acting as driven means and the pawl peg 49 acting as driving means. The ratchet teeth 48 and the pawl teeth on the pawl peg 49 are arranged so that when the piston assembly 37 is moved to the right of FIG. 4 on hydraulic operation of the wheel cylinder, the pawl teeth ride up the ratchet teeth. If the shoe to drum clearance is small then the crests of the ratchet teeth will not reach the crests of the pawl teeth and the parts return to their original positions when hydraulic pressure is released. If, however, the clearance is excessive then the ratchet teeth will ride over the crests of the pawl teeth. When the piston assembly returns, the pawl teeth act on the ratchet teeth to tend to turn the sleeve nut 45 in the direction to move the screw 43 outwards and thus increase the length of the tappet assembly. The lever 58 acts to absorb the release movement of the shoe 11 by allowing the abutment member to rotate in the bore 36 while the screw 43, sleeve nut 45 and piston body 41 continue to return to their positions as shown in FIG. 4, if the friction in the screw-threads of the screw 43 and the sleeve nut 45 should be too high to allow turning. This is particularly likely when the brake is applied hydraulically when coming to a halt on an upwards slope and the spring actuator 24 is brought into action for parking, since the torque reaction of the brake is reversed. This means that the load transmitted by the piston assemblies 37 and 38 remains high because one piston assembly 37 has to move from one extreme of travel in which it applies shoe 12 as a leading shoe to the other extreme in which it reacts the drag load of shoe 12 and acts on the other assembly 38 to apply shoe 13.

Rotation of the abutment member 39 is permitted by virtue of the opposite hand spiral of helical teeth 55. If this feature is found to be unnecessary then the helical teeth can all have the same spiral. This would permit the same screw-threads to be used and thus allow the piston assemblies 37 and 38 to be identical.

It should be noted that in the normal duo-servo mode of the brake the piston assemblies 37 and 38 and the abutment member 39 move together so that there is no adjustement effected whilst in this mode.

Figure 5:
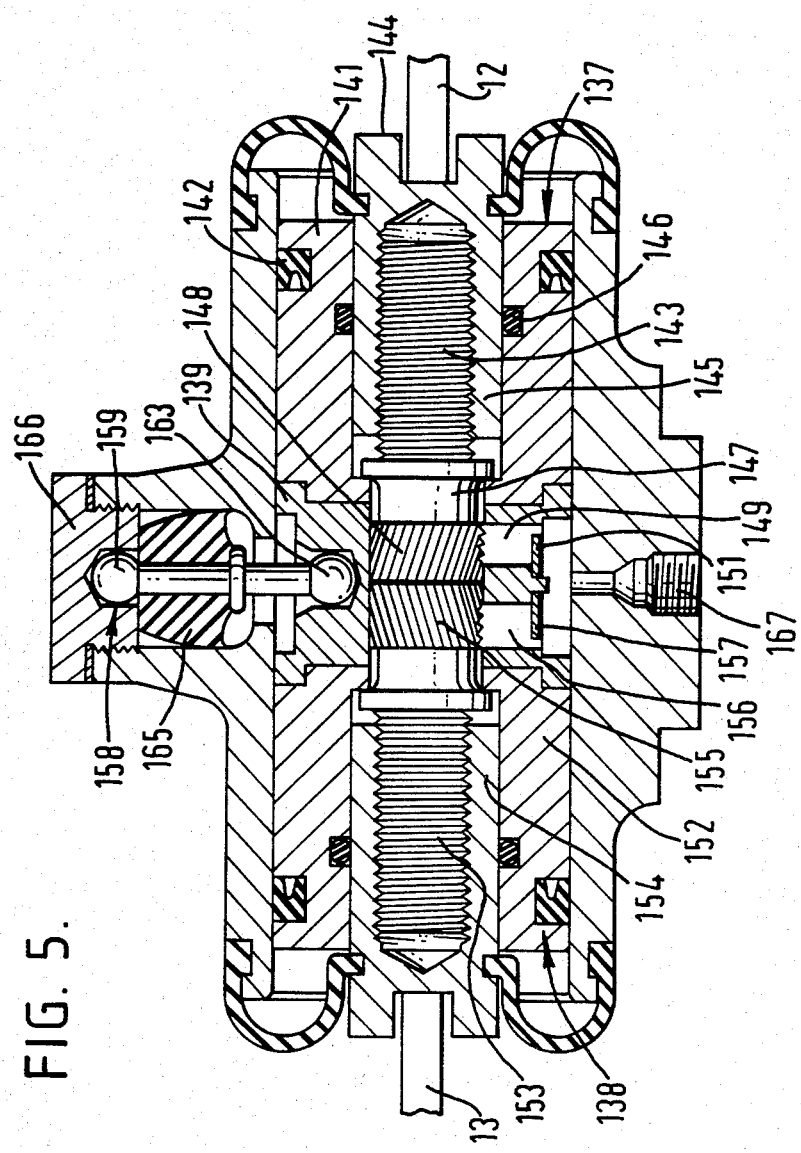
FIG. 5 is a cross-section similar to FIG. 4 showing another embodiment of a hydraulic wheel cylinder assembly according to invention.

The wheel cylinder shown in FIG. 5 is in many respects similar to that shown in FIG. 4 so that it will be convenient to give similar parts the same reference numerals, with the addition of 100, and to only describe parts which are changed significantly from the corresponding parts in FIG. 4.

There are two main areas of difference. The first concerns the tappet assemblies. The non-rotatable screw-threaded components are now sleeve nut 145 and 154, having slotted heads for the adjacent ends of brake shoes 12 and 13. The associated rotatable screw-threaded components are screws 143 and 153 having extensions for the helical ratchet teeth 148 and 155.

The second main area of difference concerns the spring centering device which comprises a lever 158 having one ball-end 159 which pivots in a recess in screw cap 166 and another ball end 163 in a recess in the abutment member 139. A rubber bush 165 provides the spring restoring force. Note that this bush, like bush 65, is slightly tapered.

Operation of the wheel cylinder shown in FIG. 5 is substantially the same as that shown in FIG. 4. The spring centering device serves the same two purposes as previously described and, since the elements of the one-way drive mechanisms are the same, automatic adjustment is effected in the same manner. The rearrangement of the components of the tappet assemblies gives an advantage in that seal 146 may be more durable as a sliding seal than seal 46 which is a rotary seal and in that the head 144 is supported solely by a sliding fit between the cylindrical surfaces of the bore of piston body 141 and the outer surface sleeve nut 143 and not by the screw and nut. These cylindrical surfaces can be machined to close tolerances relative easily, so that a close fit can be provided to support the head 144 against transverse forces from the brake shoe tip, particularly when the brake shoe linings have worn and the head 144 projects some distance beyond the piston body 141.

Figure 6:
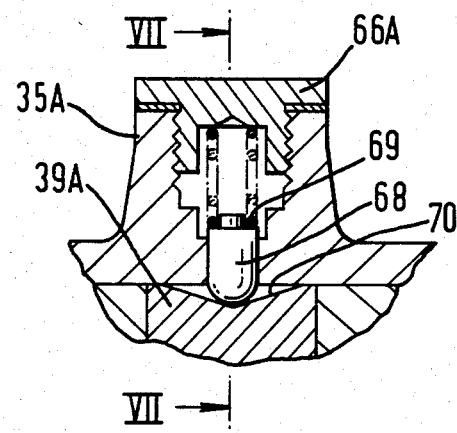
FIG. 6 is a scrap-section showing a modification to the hydraulic wheel cylinder shown in FIG. 4.
Figure 7:
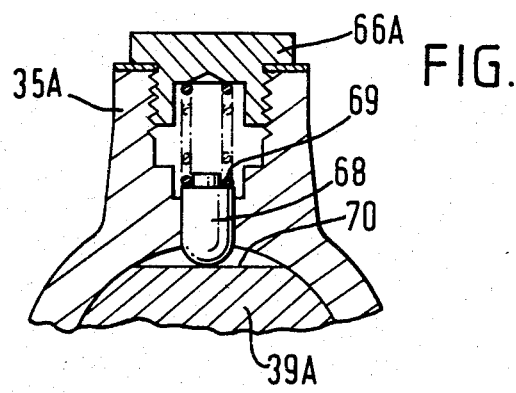
FIG. 7 is a scrap-section on the line VII—VII in FIG. 6.

The scrap-sections of FIGS. 6 and 7 show an alternative spring centering device to those shown in FIGS. 4 and 5. It comprises a detent member in the form of a plunger 68 loaded by a spring 69 which is retained by screw cap 66A. The plunger 68 has a part-spherical head which is spring loaded by the spring 69 against a cam profile on the abutment member 39A which forms a recess 70. Either linear movement or rotary movement of the abutment member will cause the plunger 68 to move towards the cap 66A against the spring load which provides a restoring force to centralise the abutment member.

To equalize the lateral force imposed on the abutment member by the plunger 68 two centralizing devices may be provided, diametrically opposite. If the recess 70 is shallow, a ball may be used in place of the plunger 68.

In a modification to the alternative shown in FIGS. 6 and 7 the spring 69 is a sliding fit in the recess in the cap 66A which is extended towards the cylinder bore so as to cover all but the last few spring coils. The plunger 68 is made shorter but with a more substantial spigot location in the spring. The cylinder body 35A is given a substantial clearance around the plunger which not tilts with the spring when the abutment member 39A is moved. Recess 70 may be made more conical to resist the turning of the abutment member during adjustment.

I claim:

1. In an internal shoe drum brake comprising a pair of brake shoes arranged for outward movement against a brake drum and a mechanical expander arranged between one pair of adjacent ends of the shoes, a hydraulic wheel cylinder assembly arranged between the other pair of adjacent ends of the shoes, said wheel cylinder assembly comprising:
    a cylinder body having a through bore therein;
    a pair of piston assemblies slidable in said bore each of said piston assemblies having a respective variable length adjustable tappet assembly which comprises a rotatable screw-threaded component interengaged with a non-rotatable screw-threaded component;
    means on each of said tappet assemblies for transmitting a thrust to an adjacent brake shoe;
    an inlet port in the cylinder body opening into said bore for supplying hydraulic pressure to urge the piston assemblies apart;
    an abutment member axially slidable in the same through bore as the said piston assemblies in either direction away from a centered position so as to enable both piston assemblies to move together so that the drag load from the trailing end of one brake shoe applied to the adjacent piston assembly is transmitted through the abutment member onto the other piston assembly and onto the leading end of the other brake shoe;
    a spring centering device acting on the abutment member resiliently to bias the abutment member into said centered position in the bore after moving together with said piston in either direction away from the centered position,
    said spring centering device comprising a lever which is pivotable on the cylinder body and on the abutment member.

2. The wheel cylinder assembly of claim 1, wherein the cylinder body defines a recess, the spring centering device further comprising a bush of resilient material which is retained in the recess and an arm of the lever which extends into the bush.

3. The wheel cylinder assembly of claim 2, wherein the lever is pivotable on the abutment by means of a part-spherical portion.

4. The wheel cylinder assembly of claim 3, wherein the lever is pivotable on the cylinder body by means of a second part-spherical portion.

5. The wheel cylinder assembly of claim 4, wherein the lever is pivotable in a detachable screwcap attached to the cylinder body.

6. In an internal shoe drum brake comprising a pair of brake shoes arranged for outward movement against a brake drum and a mechanical expander arranged between one pair of adjacent ends of the shoes, a hydraulic wheel cylinder assembly arranged between the other pair of adjacent ends of the shoes, said wheel cylinder assembly comprising:
    a cylinder body having a through bore therein;
    a pair of piston assemblies slidable in said bore each of said piston assemblies having a respective variable length adjustable tappet assembly which comprises a rotatable screw-threaded component interengaged with a non-rotatable screw-threaded component;
    means on each of said tappet assemblies for transmitting a thrust to an adjacent brake shoe;
    an inlet port in the cylinder body opening into said bore for supplying hydraulic pressure to urge the piston assemblies apart;
    an abutment member axially slidable in the same through bbore as the said piston assemblies in either direction away from a centered position so as to enable both piston assemblies to move together so that the drag load from the trailing end of one brake shoe applied to the adjacent piston assembly is transmitted through the abutment member onto the other piston assembly and onto the leading end of the other brake shoe;
    a spring centering device acting on the abutment member resiliently to bias the abutment member into said centered position in the bore after moving together with said piston in each direction away from the centered position,
    said abutment member defining a cam profile and the spring centering device comprising a detent member and a spring which urges the detent member against the cam profile.

7. The wheel cylinder assembly of claim 6, wherein the spring is a compression spring having a spigotted connection with the detent member and a depression in the abutment member defines the cam profile.

* * * * *